US012731816B2

(12) United States Patent
Park et al.

(10) Patent No.: US 12,731,816 B2
(45) Date of Patent: Sep. 8, 2026

(54) ELECTROLYTE FOR LITHIUM-SULFUR BATTERY AND LITHIUM-SULFUR BATTERY COMPRISING SAME

(71) Applicant: LG ENERGY SOLUTION, LTD., Seoul (KR)

(72) Inventors: Seonghyo Park, Daejeon (KR); Suenghoon Han, Daejeon (KR); Jaegil Lee, Daejeon (KR); Changhun Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 743 days.

(21) Appl. No.: 18/014,716

(22) PCT Filed: Jan. 18, 2022

(86) PCT No.: PCT/KR2022/000876

§ 371 (c)(1),
(2) Date: Jan. 5, 2023

(87) PCT Pub. No.: WO2022/164107

PCT Pub. Date: Aug. 4, 2022

(65) Prior Publication Data

US 2023/0299346 A1 Sep. 21, 2023

(30) Foreign Application Priority Data

Jan. 28, 2021 (KR) ........................ 10-2021-0012072

(51) Int. Cl.

*H01M 10/0567* (2010.01)
*H01M 10/052* (2010.01)

(Continued)

(52) U.S. Cl.

CPC ..... *H01M 10/0567* (2013.01); *H01M 10/052* (2013.01); *H01M 10/0568* (2013.01);

(Continued)

(58) Field of Classification Search

None

See application file for complete search history.

(56) References Cited

U.S. PATENT DOCUMENTS

| | | | | |
|---|---|---|---|---|
| 11,631,896 B2 * | 4/2023 | Ha | .................... | H01M 10/0567 429/188 |
| 11,811,018 B2 * | 11/2023 | Kim | ...................... | H01M 4/382 |

(Continued)

FOREIGN PATENT DOCUMENTS

| | | |
|---|---|---|
| CN | 104051786 A | 9/2014 |
| CN | 105098243 B | 6/2017 |

(Continued)

OTHER PUBLICATIONS

Chao, S. et al., (1987) "Solid-State Microelectrochemistry: Electrical Characteristics of a Solid-State Microelectrochemical Transistor Based on Poly(3-methylthiophene)", Journal of the American Chemical Society, vol. 109(7), pp. 2197-2199.

(Continued)

*Primary Examiner* — Kevin M Bernatz

(74) *Attorney, Agent, or Firm* — Bryan Cave Leighton Paisner LLP

(57) ABSTRACT

The present disclosure relates to an electrolyte solution for a lithium-sulfur battery containing a lithium salt, an organic solvent, and an additive, wherein the additive includes a heterocyclic compound containing one or more double bonds, the hetero atom contained in the ring of the heterocyclic compound is an oxygen atom or a sulfur atom, and the organic solvent is selected from the group consisting of a linear ether-based solvent, a cyclic ether-based solvent, and combinations thereof.

7 Claims, 2 Drawing Sheets

(51) Int. Cl.
*H01M 10/0568* (2010.01)
*H01M 10/0569* (2010.01)
*H01M 50/46* (2021.01)

(52) U.S. Cl.
CPC ....... *H01M 10/0569* (2013.01); *H01M 50/46* (2021.01); *H01M 2300/0028* (2013.01)

(56) References Cited

U.S. PATENT DOCUMENTS

| | | | | |
|---|---|---|---|---|
| 12,183,889 | B2 * | 12/2024 | Han | H01M 10/052 |
| 12,334,501 | B2 * | 6/2025 | Ha | H01M 4/04 |
| 12,341,157 | B2 * | 6/2025 | Jung | H01M 4/405 |
| 12,401,065 | B2 * | 8/2025 | Han | H01M 10/36 |
| 2002/0045102 | A1 * | 4/2002 | Jung | H01M 4/5815 429/105 |
| 2003/0073005 | A1 | 4/2003 | Kim et al. | |
| 2004/0048164 | A1 | 3/2004 | Jung et al. | |
| 2004/0185347 | A1 | 9/2004 | Kim et al. | |
| 2005/0175904 | A1 * | 8/2005 | Gorkovenko | H01M 10/052 429/329 |
| 2006/0199080 | A1 | 9/2006 | Amine et al. | |
| 2007/0212615 | A1 | 9/2007 | Jost et al. | |
| 2014/0342242 | A1 | 11/2014 | Egorov et al. | |
| 2016/0322665 | A1 | 11/2016 | Kim et al. | |
| 2016/0336625 | A1 | 11/2016 | Jeong et al. | |
| 2018/0212269 | A1 * | 7/2018 | Takada | H01M 4/5825 |
| 2018/0294476 | A1 | 10/2018 | Zhamu et al. | |
| 2018/0366777 | A1 * | 12/2018 | Sasaki | H01M 4/133 |
| 2019/0097270 | A1 | 3/2019 | Park et al. | |
| 2019/0312307 | A1 * | 10/2019 | Itabashi | H01M 10/0525 |
| 2020/0388809 | A1 | 12/2020 | Song et al. | |
| 2021/0020992 | A1 * | 1/2021 | Kawabata | H01M 10/0525 |
| 2021/0242502 | A1 | 8/2021 | Ha et al. | |
| 2022/0384849 | A1 * | 12/2022 | Jung | H01M 10/0567 |
| 2022/0393242 | A1 * | 12/2022 | Han | H01M 10/052 |
| 2022/0393243 | A1 * | 12/2022 | Han | H01M 10/0567 |
| 2023/0163360 | A1 * | 5/2023 | Kim | H01M 4/382 429/335 |
| 2023/0231120 | A1 * | 7/2023 | Lee | H01M 4/5815 429/209 |
| 2023/0231192 | A1 * | 7/2023 | Jang | H01M 10/0569 429/335 |
| 2023/0238531 | A1 * | 7/2023 | Ahn | H01M 10/0569 429/231.95 |
| 2023/0238584 | A1 * | 7/2023 | Park | H01M 10/0568 429/336 |
| 2023/0261192 | A1 * | 8/2023 | Han | H01M 4/60 429/335 |
| 2023/0318039 | A1 * | 10/2023 | Lee | H01M 10/0569 429/322 |
| 2023/0369647 | A1 * | 11/2023 | Lee | H01M 10/0525 |
| 2024/0030492 | A1 * | 1/2024 | Lee | H01M 10/0567 |
| 2024/0339601 | A1 * | 10/2024 | Lee | H01M 4/382 |
| 2024/0347773 | A1 * | 10/2024 | Jang | H01M 4/382 |
| 2025/0201927 | A1 * | 6/2025 | Kwack | H01M 4/405 |

FOREIGN PATENT DOCUMENTS

| | | | |
|---|---|---|---|
| CN | 108281659 | A | 7/2018 |
| CN | 109075394 | A | 12/2018 |
| CN | 109216769 | A | 1/2019 |
| CN | 110416597 | A | 11/2019 |
| CN | 111095602 | A | 5/2020 |
| EP | 4044316 | A1 | 8/2022 |
| JP | S62100949 | A | 5/1987 |
| JP | S62160671 | A | 7/1987 |
| JP | 2002-075446 | A | 3/2002 |
| JP | 2007522638 | A | 8/2007 |
| JP | 2008-532248 | A | 8/2008 |
| JP | 4940570 | B2 | 5/2012 |
| JP | 2016-219411 | A | 12/2016 |
| KR | 10-2003-0031396 | A | 4/2003 |
| KR | 10-2004-0022972 | A | 3/2004 |
| KR | 10-2005-0038897 | A | 4/2005 |
| KR | 10-0578797 | B1 | 5/2006 |
| KR | 10-2006-0135958 | A | 12/2006 |
| KR | 10-2007-0027512 | A | 3/2007 |
| KR | 10-2008-0067964 | A | 7/2008 |
| KR | 10-1149830 | B1 | 5/2012 |
| KR | 10-2014-0135038 | A | 11/2014 |
| KR | 10-2015-0072239 | A | 6/2015 |
| KR | 10-0527827 | B1 | 11/2015 |
| KR | 10-2016-0128014 | A | 11/2016 |
| KR | 10-2126252 | B1 | 6/2020 |
| KR | 10-2020-0132015 | A | 11/2020 |
| KR | 10-2021-0138511 | A | 11/2021 |
| WO | 2020/105981 | A1 | 5/2020 |

OTHER PUBLICATIONS

Wu Yang et al., (2017) "Pyrrole as a Promising Electrolyte Additive to Trap Polysulfides for Lithium-Sulfur Batteries", Journal of Power Sources vol. 348, pp. 175-182.

Guo et al. (2019), "Sulfur-Impregnated Disordered Carbon Nanotubes Cathode for Lithium-Sulfur Batteries," American Chemical Society, NANO Letters, 2011, 11, 4288-4294, Sep. 19, 2011, 14 pages.

* cited by examiner

【Figure 1】
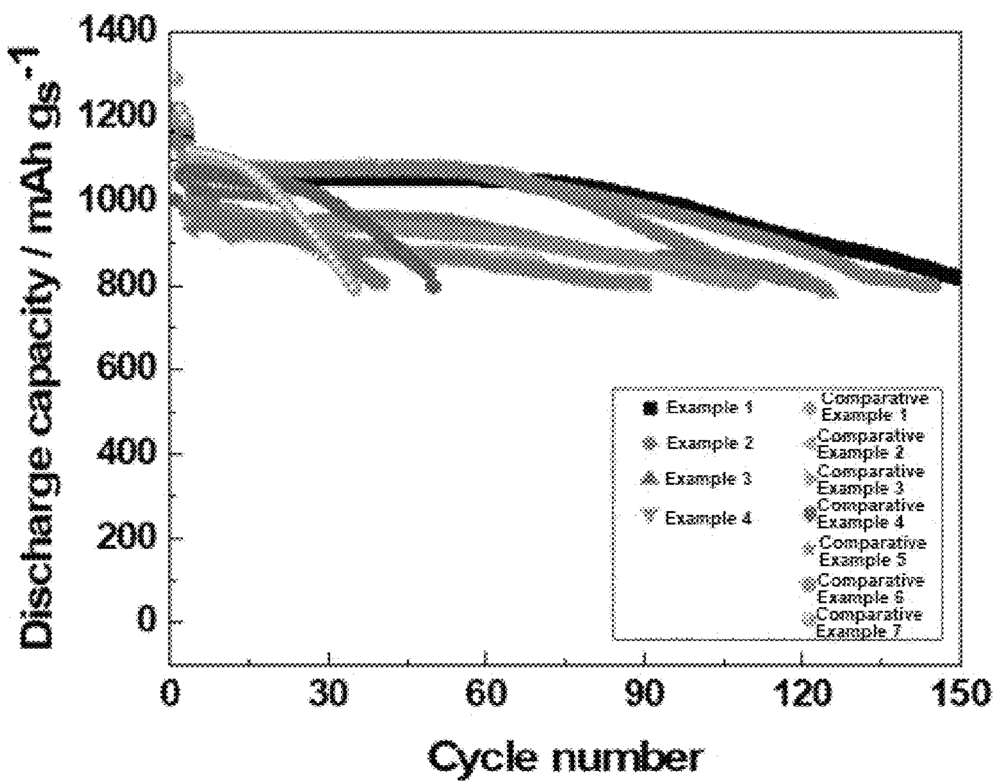

【Figure 2】
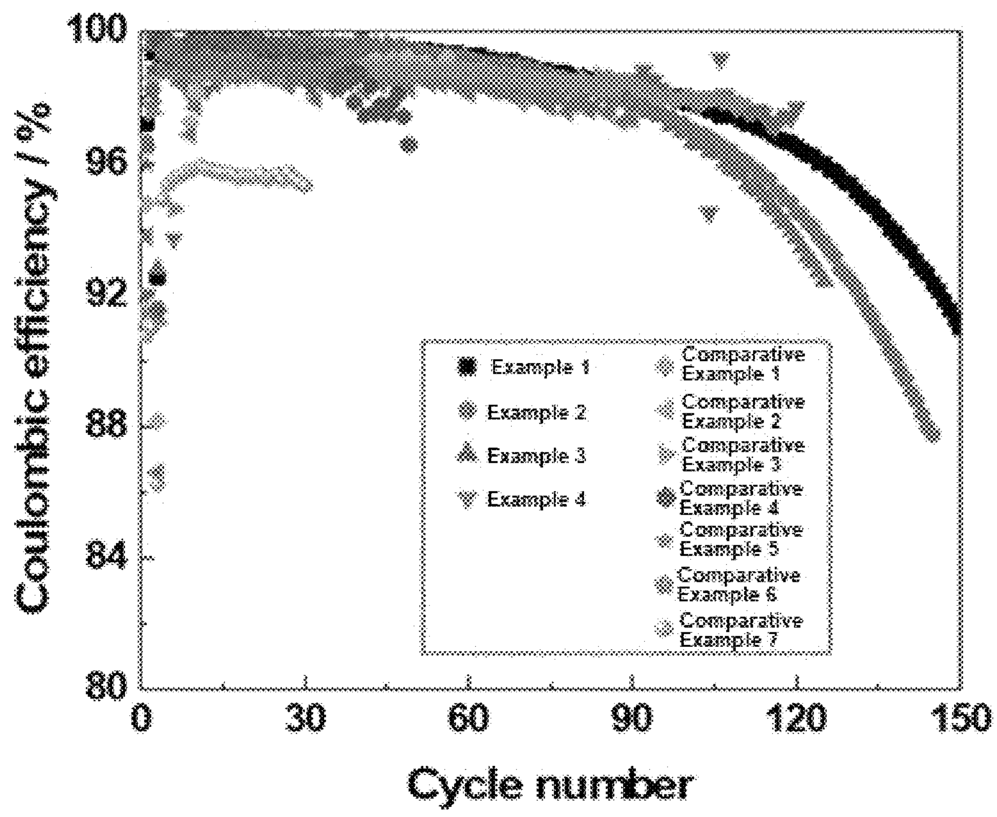

ELECTROLYTE FOR LITHIUM-SULFUR BATTERY AND LITHIUM-SULFUR BATTERY COMPRISING SAME

CROSS-REFERENCE TO RELATED APPLICATIONS

This application is a National Phase entry pursuant to 35 U.S.C. § 371 of International Application No. PCT/KR2022/000876, filed on Jan. 18, 2022, and claims the benefit of and priority to Korean Patent Application No. 10-2021-0012072, filed on Jan. 28, 2021, the disclosures of which are incorporated by reference in their entirety for all purposes as if fully set forth herein.

TECHNICAL FIELD

The present disclosure relates to an electrolyte solution for a lithium-sulfur battery and a lithium-sulfur battery comprising the same.

BACKGROUND

As the scope of use of a secondary battery has been expanded from small portable electronic devices to medium and large-sized electric vehicles (EV), energy storage systems (ESS), and electric ships, the demand for a lithium secondary battery with high capacity, high energy density, and long lifetime is rapidly increasing.

A lithium-sulfur secondary battery means a battery system using a sulfur-based material having a 'sulfur-sulfur bond (S—S bond)' as a positive electrode active material and using lithium metal as a negative electrode active material. There is an advantage that sulfur, which is the main material of the positive electrode active material in the lithium-sulfur battery, has a low atomic weight, is very rich in resources and thus easy to supply and receive, and also is cheap, thereby lowering the manufacturing cost of the battery, and is non-toxic and thus environmentally friendly.

In particular, since the lithium-sulfur secondary battery has a theoretical discharge capacity of 1,675 mAh/g-sulfur, and can theoretically realize a high energy storage density of 2,600 Wh/kg compared to its weight, it has a very high value compared to the theoretical energy density of other battery systems (Ni-MH battery: 450 Wh/kg, Li—FeS battery: 480 Wh/kg, Li—$MnO_2$ battery: 1,000 Wh/kg, Na—S battery: 800 Wh/kg) and a lithium-ion battery (250 Wh/kg) currently being studied, and thus is receiving great attention in the market of the medium and large-sized secondary batteries that are being developed so far.

During the discharging of the lithium-sulfur secondary battery, an oxidation reaction occurs at the negative electrode where lithium releases electrons and becomes lithium cations, and a reduction reaction occurs at the positive electrode where the sulfur-based material accepts electrons to form a sulfur anion. Through the oxidation-reduction reaction, sulfur is converted from the cyclic $S_8$ structure before discharging into a linear lithium polysulfide ($Li_2S_x$, x=8, 6, 4, 2), and in the case of complete reduction, lithium sulfide ($Li_2S$) is finally produced.

In particular, lithium polysulfide with a high oxidation number of sulfur ($Li_2S_x$, x>4) is easily dissolved in the organic electrolyte solution, and the lithium polysulfide generated by the concentration difference gradually diffuses away from the positive electrode. As a result, as the lithium polysulfide leached from the positive electrode is gradually lost out of the reaction region of the positive electrode, the amount of sulfur substances participating in the electrochemical reaction at the positive electrode is reduced, resulting in a decrease in the charging capacity of the lithium-sulfur secondary battery.

In addition, there are problems that the leaching of the lithium polysulfide increases the viscosity of the electrolyte solution and reduces ion conductivity, the lithium polysulfide reacts directly with the negative electrode of lithium metal by continuous charging/discharging reaction, and lithium sulfide ($Li_2S$) is adhered to the surface of lithium metal, and thus the reaction activity is lowered and the potential characteristic is deteriorated.

The lithium-sulfur secondary battery having these problems has been pointed out as a disadvantage in that due to the side reaction of the electrolyte solution, the instability of lithium metal and the deposition of by-products on the positive electrode, the lifetime is deteriorated as the charging and discharging efficiency is gradually decreased through the repetition of charging and discharging of the battery.

In order to improve the problem of deterioration of the lifetime of the lithium-sulfur secondary battery, various studies have been conducted to increase the capacity and lifetime of the battery through various combinations of organic solvents and lithium salts contained in the electrolyte solution. However, there was a limit to improving the lifetime of the lithium-sulfur secondary battery only by using a commonly used organic solvent and lithium salt.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

DISCLOSURE

Technical Problem

In order to solve the above problems, the present inventors intend to provide a lithium-sulfur battery that improves the lifetime characteristics of the lithium-sulfur battery by using an electrolyte solution containing a heterocyclic compound as an additive while not using a dioxolane-based organic solvent.

Technical Solution

According to a first aspect of the invention, the present disclosure provides an electrolyte solution for a lithium-sulfur battery, comprising: a lithium salt, an organic solvent and an additive, wherein the additive comprises a heterocyclic compound containing one or more double bonds, wherein a hetero atom included in a ring of the heterocyclic compound is an oxygen atom or a sulfur atom, and wherein the organic solvent is selected from the group consisting of a linear ether-based solvent, a cyclic ether-based solvent, and a combination thereof.

The heterocyclic compound may be a 3 to 15 membered heterocyclic compound.

The heterocyclic compound containing one or more double bonds may comprise a heterocyclic compound unsubstituted or substituted with one selected from the group consisting of an alkyl group having 1 to 4 carbon atoms, a cyclic alkyl group having 3 to 8 carbon atoms, an aryl group having 6 to 10 carbon atoms, a halogen group, a nitro group, an amine group, a sulfonyl group, and a combination thereof; or a multicyclic compound of a heterocyclic compound and one of a cyclic alkyl group having 3 to 8 carbon atoms, an aryl group having 6 to 10 carbon atoms and a combination thereof.

The heterocyclic compound may be selected from the group consisting of furan, 2-methylfuran, 3-methylfuran, 2-ethylfuran, 2-propylfuran, 2-butylfuran, 2,3-dimethylfuran, 2,4-dimethylfuran, 2,5-dimethylfuran, pyran, 2-methylpyran, 3-methylpyran, 4-methylpyran, benzofuran, 2-(2-nitrovinyl)furan, thiophene, 2-methylthiophene, 2-ethylthiophene, 2-propylthiophene, 2-butylthiophene, 2,3-dimethylthiophene, 2,4-dimethylthiophene, 2,5-dimethylthiophene, and a combination thereof.

The organic solvent may be a linear ether-based solvent.

The linear ether-based solvent may be selected from the group consisting of dimethyl ether, diethyl ether, dipropyl ether, dibutyl ether, diisobutyl ether, ethylmethyl ether, ethylpropyl ether, ethyl tertbutyl ether, dimethoxymethane, trimethoxymethane, dimethoxyethane, diethoxyethane, dimethoxypropane, diethylene glycol dimethyl ether, diethylene glycol diethyl ether, triethylene glycol dimethyl ether, tetraethylene glycol dimethyl ether, ethylene glycol divinyl ether, diethylene glycol divinyl ether, triethylene glycol divinyl ether, dipropylene glycol dimethylene ether, butylene glycol ether, diethylene glycol ethyl methyl ether, diethylene glycol isopropyl methyl ether, diethylene glycol butyl methyl ether, diethylene glycol tertbutyl ethyl ether, ethylene glycol ethyl methyl ether, and a combination thereof.

The cyclic ether-based solvent may not include a solvent selected from the group consisting of dioxolane, methyldioxolane, dimethyldioxolane, vinyldioxolane, methoxydioxolane, ethylmethyldioxolane, and a combination thereof.

The cyclic ether-based solvent may be selected from the group consisting of dioxane, trioxane, tetrahydrofuran, methyltetrahydrofuran, dimethyltetrahydrofuran, dimethoxytetrahydrofuran, ethoxytetrahydrofuran, tetrahydropyran, and a combination thereof.

The heterocyclic compound may be contained in a volume ratio of 1 to 24 relative to 100 volume ratio of the organic solvent.

The heterocyclic compound may be included in an amount of 15 to 24 volume relative to 100 volume ratio of the organic solvent.

The heterocyclic compound may be 2-methylfuran, and the organic solvent may be dimethoxyethane.

The lithium salt may be selected from the group consisting of LiCl, LiBr, LiI, $LiClO_4$, $LiBF_4$, $LiB_{10}Cl_{10}$, $LiPF_6$, $LiCF_3SO_3$,$LiCF_3CO_2$, $LiC_4BO_8$, $LiAsF_6$, $LiSbF_6$, $LiAlCl_4$, $CH_3SO_3Li$, $CF_3SO_3Li$, $(CF_3SO_2)_2NLi$, $(C_2F_5SO_2)_2NLi$, $(SO_2F)_2NLi$, $(CF_3SO_2)_3CLi$, lithium chloroborane, lithium lower aliphatic carboxylate, lithium tetra phenyl borate, lithium imide, and a combination thereof.

According to a second aspect of the invention, the present disclosure provides a lithium-sulfur battery comprising a positive electrode; negative electrode; a separator between the positive electrode and the negative electrode; and the electrolyte solution as described above.

Advantageous Effects

The lithium-sulfur battery according to the present disclosure forms a protective film on the surface of the negative electrode, which is a lithium-based metal, by addition of a heterocyclic compound in an electrolyte solution, and thus the formation of lithium dendrites can be suppressed and the decomposition and side reactions of the electrolyte solution on the lithium-based metal surface can be reduced.

In addition, by not using the dioxolane-based organic solvent commonly used as an organic solvent in the electrolyte solution, there is an excellent effect of improving the Coulombic efficiency (C.E) and the lifespan characteristics of the lithium-sulfur battery through the effect of reducing the leaching of polysulfide into the electrolyte solution.

BRIEF DESCRIPTION OF DRAWINGS

FIG. 1 is a graph showing the lifetime characteristics of the lithium-sulfur batteries of Examples 1 to 4 of the present disclosure and Comparative Examples 1 to 7.

FIG. 2 is a graph showing the Coulombic efficiency of the lithium-sulfur batteries of Examples 1 to 4 of the present disclosure and Comparative Examples 1 to 7.

DETAILED DESCRIPTION

The embodiments provided according to the present disclosure can all be achieved by the following description. It is to be understood that the following description describes preferred embodiments of the present disclosure, and it should be understood that the present disclosure is not necessarily limited thereto.

As used herein, the term "polysulfide" is a concept that includes both "polysulfide ion ($S_x^{2-}$, x=8, 6, 4, 2)" and "lithium polysulfide ($Li_2S_x$ or $LiS_x^-$, x=8, 6, 4, 2)."

Electrolyte Solution for Lithium-Sulfur Battery

In the electrolyte solution for the lithium-sulfur battery comprising a lithium salt, an organic solvent, and an additive according to the present disclosure, the additive comprises a heterocyclic compound comprising one or more double bonds, the hetero atom comprised in the ring of the heterocyclic compound is an oxygen atom or a sulfur atom, and the organic solvent is selected from the group consisting of a linear ether-based solvent, a cyclic ether-based solvent, and combinations thereof.

The additive may comprise a heterocyclic compound including one or more double bonds, and the hetero atom comprised in the ring of the heterocyclic compound may be an oxygen atom or a sulfur atom.

By incorporating the heterocyclic compound as an additive to the electrolyte solution for the lithium-sulfur battery, the formation of lithium dendrite is suppressed and a polymer protective film capable of reducing the decomposition and side reactions of the electrolyte solution on the surface of the lithium-based metal is formed on the surface of the lithium-based metal, which is the negative electrode, so that excellent lifetime characteristics of the battery may be exhibited.

The heterocyclic compound may be a 3 to 15 membered heterocyclic compound, preferably a 3 to 7 membered heterocyclic compound, and more preferably a 5 to 6 membered heterocyclic compound.

The heterocyclic compound may comprise a heterocyclic compound substituted or unsubstituted by at least one selected from the group consisting of an alkyl group having 1 to 4 carbon atoms, a cyclic alkyl group having 3 to 8 carbon atoms, an aryl group having 6 to 10 carbon atoms, a halogen group, a nitro group ($-NO_2$), an amine group ($-NH_2$), a sulfonyl group ($-SO_2$) and combinations thereof; or at least one selected from the group consisting of a cyclic alkyl group having 3 to 8 carbon atoms, an aryl group having 6 to 10 carbon atoms and combinations thereof and a multicyclic compound of a heterocyclic compound.

If the heterocyclic compound comprises a heterocyclic compound substituted with an alkyl group having 1 to 4 carbon atoms, the radicals are stabilized and thus side reactions between the additive and the electrolyte solution can be suppressed. In addition, the heterocyclic compound substituted with a halogen group or a nitro group can form a functional protective film on the surface of the lithium-based metal. The functional protective film is a stable and compact protective film, enables uniform deposition of lithium-based metal, and can suppress side reactions between polysulfide and lithium-based metal.

The heterocyclic compound may be selected from the group consisting of furan, 2-methylfuran, 3-methylfuran, 2-ethylfuran, 2-propylfuran, 2-butylfuran, 2,3-dimethylfuran, 2,4-dimethylfuran, 2,5-dimethylfuran, pyran, 2-methylpyran, 3-methylpyran, 4-methylpyran, benzofuran, 2-(2-nitrovinyl)furan, thiophene, 2-methylthiophene, 2-ethylthiophene, 2-propylthiophene, 2-butylthiophene, 2,3-dimethylthiophene, 2,4-dimethylthiophene, 2,5-dimethylthiophene and combinations thereof, and preferably may be selected from the group consisting of 2-methylfuran, 2-methylthiophene and combinations thereof, and more preferably may be 2-methylfuran.

In a lithium-sulfur battery using a lithium-based metal as a negative electrode, if the heterocyclic compound of the present disclosure as an additive is comprised in the electrolyte solution for the lithium-sulfur battery, it is possible to suppress the generation of lithium dendrites by stably forming a protective film (solid electrolyte interface, SEI layer) on the surface of lithium-based metal by ring opening polymerization of heterocyclic compounds in the initial discharging stage of the battery, and to further improve the lifetime characteristics of the lithium-sulfur battery by reducing the decomposition of the electrolyte solution on the surface of the lithium-based metal and its side reactions. Therefore, in order to form the protective film, the heterocyclic compound must have at least one double bond, and oxygen or sulfur as a hetero atom contained in the ring of the heterocyclic compound is included to make it polar, thereby increasing the affinity with the organic solvent of the electrolyte solution, and thus facilitating the use of the electrolyte solution as an additive and forming the polymer protective film.

However, if a nitrogen atom is included as a hetero atom included in the ring of the heterocyclic compound, as the resistance of the cell is increased, the lifetime of the lithium-sulfur battery may be reduced.

The ratio of the heterocyclic compound may be 1 volume ratio or more, 2 volume ratio or more, 3 volume ratio or more, 4 volume ratio or more, 5 volume ratio or more, 6 volume ratio or more, 7 volume ratio or more, 8 volume ratio or more, 9 volume ratio or more, 10 volume ratio or more, 11 volume ratio or more, 12 volume ratio or more, 13 volume ratio or more, 14 volume ratio or more, 15 volume ratio or more, 16 volume ratio or more, 17 volume ratio or more, 18 volume ratio or more, 19 volume ratio or more, 20 volume ratio or more or 21 volume ratio or more, and 24 volume ratio or less or 23 volume ratio or less, relative to 100 volume ratio of the organic solvent. If the heterocyclic compound is contained in an amount of less than 1 volume ratio relative to 100 volume ratio of the organic solvent, there may be problems that it is difficult to form a protective film on the surface of lithium-based metal and an excessive amount of lithium polysulfide is dissolved in the electrolyte solution. On the other hand, if the heterocyclic compound exceeds 24 volume ratio relative to 100 volume ratio of the organic solvent, there may be a problem that the overvoltage is increased due to the high viscosity and low ion conductivity.

The heterocyclic compound may exhibit a characteristic that is difficult to dissolve salt due to delocalization of the lone pair electrons of the hetero atom in the cycle, and thus may reduce the ability to solvate lithium polysulfide, thereby reducing the leaching amount of polysulfide in the electrolyte solution. As a result, the increase in the resistance of the electrolyte solution of the lithium-sulfur battery can be suppressed and thus the lifetime characteristics can be improved.

The organic solvent may be selected from the group consisting of a linear ether-based solvent, a cyclic ether-based solvent, and combinations thereof.

The organic solvent may be composed of a linear ether-based solvent.

The linear ether-based solvent may be selected from the group consisting of dimethyl ether, diethyl ether, dipropyl ether, dibutyl ether, diisobutyl ether, ethylmethyl ether, ethylpropyl ether, ethyltertbutyl ether, dimethoxymethane, trimethoxymethane, dimethoxyethane, diethoxyethane, dimethoxypropane, diethylene glycol dimethyl ether, diethylene glycol diethyl ether, triethylene glycol dimethyl ether, tetraethylene glycol dimethyl ether, ethylene glycol divinyl ether, diethylene glycol divinyl ether, triethylene glycol divinyl ether, dipropylene glycol dimethylene ether, butylene glycol ether, diethylene glycol ethyl methyl ether, diethylene glycol isopropyl methyl ether, diethylene glycol butyl methyl ether, diethylene glycol tertbutyl ethyl ether, ethylene glycol ethyl methyl ether, and combinations thereof, and preferably may be dimethoxyethane.

The cyclic ether-based solvent may not be selected from the group consisting of dioxolane, methyldioxolane, dimethyldioxolane, vinyldioxolane, methoxydioxolane, ethylmethyldioxolane, and combinations thereof. When a dioxolane-based organic solvent is comprised as a cyclic ether-based solvent comprised in the organic solvent, the lifetime characteristics of the battery may also be deteriorated due to a sharp drop in the Coulombic efficiency in terms of an increase in the amount of polysulfide leaching into the electrolyte solution.

The cyclic ether-based solvent may be selected from the group consisting of dioxane, trioxane, tetrahydrofuran, methyltetrahydrofuran, dimethyltetrahydrofuran, dimethoxytetrahydrofuran, ethoxytetrahydrofuran, tetrahydropyran, and combinations thereof.

In the electrolyte solution for the lithium-sulfur battery, preferably, the heterocyclic compound is 2-methylfuran, and the organic solvent may be dimethoxyethane. In the lithium-sulfur battery, an electrolyte solution in which 2-methylfuran is added as an additive to the organic solvent dimethoxyethane may be a desirable combination to improve lifetime characteristics, in terms of not only reducing the adverse effects of polysulfide generated from the positive electrode leaching into the electrolyte solution, but also stabilizing the surface of lithium metal.

The lithium salt may be selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiC_4BO_8$, $LiAsF_6$, $LiSbF_6$, $LiAlCl_4$, $CH_3SO_3Li$, $CF_3SO_3Li$, $(CF_3SO_2)_2NLi$, $(C_2F_5SO_2)_2NLi$, $(SO_2F)_2NLi$, $(CF_3SO_2)_3CLi$, lithium chloroborane, lithium lower aliphatic carboxylate, lithium tetraphenyl borate, lithium imide and combinations thereof, and preferably, the lithium salt may be $(SO_2F)_2NLi$(lithium bis(fluorosulfonyl) imide, LiFSI).

The concentration of the lithium salt may be determined in consideration of ion conductivity, and may be, for example, 0.1 to 4 M, preferably 0.5 to 2 M. If the concentration of the lithium salt is less than the above range, it is difficult to ensure ion conductivity suitable for operating the battery. On the contrary, if the concentration exceeds the above range, the viscosity of the electrolyte solution is increased to lower the mobility of the lithium ion and the decomposition reaction of the lithium salt itself may increase to deteriorate the performance of the battery. Therefore, the concentration is adjusted appropriately within the above range.

The method for preparing the electrolyte solution for the lithium-sulfur battery according to the present disclosure is not particularly limited in the present disclosure, and may be prepared by a conventional method known in the art.

Lithium-Sulfur Battery

The lithium-sulfur battery according to the present disclosure comprises a positive electrode; a negative electrode; a separator interposed between the positive electrode and the negative electrode; and an electrolyte solution, wherein the electrolyte solution includes the electrolyte solution for the lithium-sulfur battery according to the present disclosure described above.

The electrolyte solution of the lithium-sulfur battery of the present disclosure is the electrolyte solution for the lithium-sulfur battery of the present disclosure described above.

The positive electrode may comprise a positive electrode current collector and a positive electrode active material layer coated on one or both surfaces of the positive electrode current collector.

The positive electrode current collector supports the positive electrode active material and is not particularly limited as long as it has high conductivity without causing chemical change in the battery. For example, copper, stainless steel, aluminum, nickel, titanium, palladium, sintered carbon; copper or stainless steel surface-treated with carbon, nickel, silver or the like; aluminum-cadmium alloy or the like may be used as the positive electrode current collector.

The positive electrode current collector can enhance the bonding force with the positive electrode active material by having fine irregularities on its surface, and may be formed in various forms such as film, sheet, foil, mesh, net, porous body, foam, or nonwoven fabric.

The positive electrode active material layer may comprise a positive electrode active material, a binder, and an electrically conductive material.

The positive electrode active material may be at least one selected from the group consisting of elemental sulfur($S_8$), an organic sulfur compound, $Li_2S_n$(n≥1) and a carbon-sulfur polymer ($(C_2S_x)_n$:x=2.5~50, n≥2).

Sulfur contained in the positive electrode active material is used in combination with a conductive material such as a carbon material because it does not have electrical conductivity alone. Accordingly, sulfur is comprised in the form of a sulfur-carbon composite, and preferably, the positive electrode active material may be a sulfur-carbon composite.

The carbon in the sulfur-carbon composite is a porous carbon material and provides a framework capable of uniformly and stably immobilizing sulfur, which is a positive electrode active material, and supplements the low electrical conductivity of sulfur to enable the electrochemical reaction to proceed smoothly.

The porous carbon material may have a porous structure or a high specific surface area, and may be any of those conventionally used in the art. For example, the porous carbon material may be, but is not limited to, at least one selected from the group consisting of graphite; graphene; carbon blacks such as Denka black, acetylene black, Ketjen black, channel black, furnace black, lamp black, and thermal black; carbon nanotubes (CNTs) such as single wall carbon nanotube (SWCNT) and multiwall carbon nanotubes (MWCNT); carbon fibers such as graphite nanofiber (GNF), carbon nanofiber (CNF), and activated carbon fiber (ACF); and natural graphite, artificial graphite, expanded graphite, and activated carbon, preferably carbon nanotubes (CNTs).

The method for preparing the sulfur-carbon composite is not particularly limited in the present disclosure, and a method commonly used in the art may be used.

The positive electrode may further comprise one or more additives, in addition to the positive electrode active material, selected from transition metal elements, group IIIA elements, group IVA elements, sulfur compounds of these elements, and alloys of these elements with sulfur.

The transition metal element may comprise Sc, Ti, V, Cr, Mn, Fe, Co, Ni, Cu, Zn, Y, Zr, Nb, Mo, Tc, Ru, Rh, Pd, Os, Ir, Pt, Au, Hg and the like, and the group IIIA element may comprise Al, Ga, In, Ti and the like, and the group IVA element may comprise Ge, Sn, Pb, and the like.

The electrically conductive material is a material that acts as a path, through which electrons are transferred from the current collector to the positive electrode active material, by electrically connecting the electrolyte solution and the positive electrode active material. The electrically conductive material can be used without limitation as long as it has electrical conductivity.

For example, as the electrically conductive material, graphite such as natural graphite or artificial graphite; carbon blacks such as Super-P, Denka black, acetylene black, Ketjen black, channel black, furnace black, lamp black, and thermal black; carbon derivatives such as carbon nanotubes and fullerenes; electrically conductive fibers such as carbon fibers and metal fibers; carbon fluoride; metal powders such as aluminum and nickel powder; or electrically conductive polymers such as polyaniline, polythiophene, polyacetylene, and polypyrrole may be used alone or in combination.

The binder maintains the positive electrode active material in the positive electrode current collector, and organically connects the positive electrode active materials to increase the bonding force between them, and any binder known in the art may be used.

For example, the binder may be any one selected from fluororesin-based binders comprising polyvinylidene fluoride (PVdF) or polytetrafluoroethylene (PTFB); rubber-based binders comprising styrene butadiene rubber (SBR), acrylonitrile-butadiene rubber, and styrene-isoprene rubber; cellulose-based binders comprising carboxymethylcellulose (CMC), starch, hydroxy propyl cellulose, and regenerated cellulose; polyalcohol-based binders; polyolefin-based binders comprising polyethylene and polypropylene; polyimide-based binders; polyester-based binders; and silane-based binders, or mixtures or copolymers of two or more thereof.

The method of manufacturing the positive electrode is not particularly limited in the present disclosure, and a method commonly used in the art may be used. As an example, the positive electrode may be prepared by preparing a slurry composition for a positive electrode, and then applying the slurry composition to at least one surface of the positive electrode current collector.

The slurry composition for a positive electrode comprises the positive electrode active material, an electrically conductive material, and a binder as described above, and may further comprise a solvent other than the above.

As the solvent, one capable of uniformly dispersing a positive electrode active material, an electrically conductive material, and a binder is used. Such a solvent is an aqueous solvent, and water is most preferred, and in this case, water may be distilled water or de-ionized water. However, it is not necessarily limited thereto, and if necessary, a lower alcohol that can be easily mixed with water may be used. Examples of the lower alcohol include methanol, ethanol, propanol, isopropanol, and butanol, and preferably, they may be used in combination with water.

The loading amount of sulfur in the positive electrode may be 1 to 10 $mAh/cm^2$, preferably 3 to 6 $mAh/cm^2$.

The negative electrode may comprise a negative electrode current collector and a negative electrode active material layer coated on one or both surfaces of the negative electrode current collector. Alternatively, the negative electrode may be a lithium metal plate.

The negative electrode current collector is for supporting the negative electrode active material layer, and is not particularly limited as long as it has high conductivity without causing chemical changes in the battery, and may be selected from the group consisting of copper, aluminum, stainless steel, zinc, titanium, silver, palladium, nickel, iron, chromium, and alloys and combinations thereof. The stainless steel can be surface-treated with carbon, nickel, titanium, or silver, and the alloy may be an aluminum-cadmium alloy. In addition to those, sintered carbon, a non-conductive polymer surface-treated with an electrically conductive material, or an electrically conductive polymer may be used.

In addition, the shape of the negative electrode current collector can be various forms such as a film having or not having fine irregularities on a surface, sheet, foil, net, porous body, foam, nonwoven fabric and the like.

The negative electrode active material layer may comprise an electrically conductive material, a binder, etc. in addition to the negative electrode active material. At this time, the electrically conductive material and the binder are as described above.

The negative electrode active material may comprise a material capable of reversibly intercalating or de-intercalating lithium ($Li^+$), a material capable of reversibly forming lithium containing compounds by reacting with lithium ion, or lithium metal or lithium alloy.

The material capable of reversibly intercalating or de-intercalating lithium ion ($Li^+$) can be, for example, crystalline carbon, amorphous carbon, or a mixture thereof. The material capable of reacting with lithium ion ($Li^+$) to reversibly form lithium containing compounds may be, for example, tin oxide, titanium nitrate, or silicone. The lithium alloy may be, for example, an alloy of lithium (Li) and a metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn).

Preferably, the negative electrode active material may be lithium metal, and specifically may be in the form of a lithium metal thin film or lithium metal powder.

The method of forming the negative electrode active material is not particularly limited, and a method of forming a layer or film commonly used in the art may be used. For example, a method such as compression, coating, or deposition may be used. In addition, a case, in which a thin film of metallic lithium is formed on a metal plate by initial charging after assembling a battery without a lithium thin film in the current collector, is also comprised in the negative electrode of the present disclosure.

A conventional separator may be interposed between the positive electrode and the negative electrode.

The separator is a physical separator having a function of physically separating the electrodes, and can be used without particular limitation as long as it is used as a conventional separator, and particularly, a separator with low resistance to ion migration in the electrolyte solution and excellent impregnating ability for the electrolyte solution is preferable.

In addition, the separator enables the transport of lithium ions between the positive electrode and the negative electrode while separating or insulating the positive electrode and the negative electrode from each other. The separator may be made of a porous, nonconductive, or insulating material. The separator can be used without any particular limitation as long as it is normally used as a separator in a lithium-sulfur battery. The separator may be an independent member such as a film, or a coating layer added to the positive electrode and/or the negative electrode.

The separator may be made of a porous substrate. The porous substrate can be used as long as it is a porous substrate commonly used in a secondary battery, and may be composed of a porous polymer film alone or by laminating them, and for example, may be a non-woven fabric made of glass fiber or polyethylene terephthalate fiber with high melting point, etc., or a polyolefin-based porous film, but is not limited thereto.

The material of the porous substrate is not particularly limited in the present disclosure, and any material can be used as long as it is a porous substrate commonly used in a lithium-sulfur battery. For example, the porous substrate may comprise at least one material selected from the group consisting of polyolefin such as polyethylene and polypropylene, polyester such as polyethyleneterephthalate and polybutyleneterephthalate, polyamide, polyacetal, polycarbonate, polyimide, polyetheretherketone, polyethersulfone, polyphenyleneoxide, polyphenylenesulfide, polyethylenenaphthalate, polytetrafluoroethylene, polyvinylidene fluoride, polyvinyl chloride, polyacrylonitrile, cellulose, nylon, poly(p-phenylene benzobisoxazole, and polyarylate.

The thickness of the porous substrate is not particularly limited, but may be 1 to 100 μM, preferably 5 to 50 μM. Although the thickness range of the porous substrate is not particularly limited to the above-mentioned range, if the thickness is excessively thinner than the lower limit described above, mechanical properties are deteriorated and thus the separator may be easily damaged during use of the battery.

The average size and porosity of the pores present in the porous substrate are also not particularly limited, but may be 0.1 to 50 μM and 10 to 95%, respectively.

The electrolyte solution is used for causing an electrochemical oxidation or reduction reaction between the positive electrode and the negative electrode through these and is as described above.

The injection of the electrolyte solution may be performed at the appropriate stage of the manufacturing process of the lithium-sulfur battery, depending on the manufacturing process and required properties of the final product. That is, the injection can be performed before assembling the electrochemical device or at the final stage of assembling the lithium-sulfur battery.

The lithium-sulfur battery according to the present disclosure can be manufactured by lamination, stacking, and folding processes of the separator and the electrodes, in addition to the usual winding process.

The shape of the lithium-sulfur battery is not particularly limited, and may be various shapes such as a cylindrical shape, a laminate shape, and a coin shape.

Hereinafter, in order to facilitate understanding of the present disclosure, preferred embodiments of the present disclosure will be described. However, the following examples are provided to make the present disclosure easier to understand, and the present disclosure is not limited thereto.

Example: Manufacture of Lithium-Sulfur Battery

Preparation of Electrolyte Solution for Lithium-Sulfur Battery: Preparation Examples 1 to 11

Preparation Example 1

1,2-dimethoxyethane as an organic solvent, and 2-methylfuran as an additive, were mixed at a volume ratio of 4.5:1, respectively, and 0.75 M lithium bis(fluorosulfonyl)imide (LiFSI) and 5 wt % $LiNO_3$ were dissolved to prepare an electrolyte solution for a lithium-sulfur battery.

Preparation Examples 2 to 7

Electrolyte solutions for the lithium-sulfur battery were prepared in the same manner as in Preparation Example 1, except that the mixing volume ratio of 1,2-dimethoxyethane as an organic solvent and 2-methylfuran as an additive was changed as shown in Table 1 below.

Preparation Examples 8 and 9

Electrolyte solutions for the lithium-sulfur battery were prepared in the same manner as in Preparation Example 1, except that 1,3-dioxolane as well as 1,2-dimethoxyethane as an organic solvent were additionally added and mixed with 2-methylfuran as an additive at the volume ratio of Table 1 below.

Preparation Examples 10 and 11

Electrolyte solutions for the lithium-sulfur battery were prepared in the same manner as in Preparation Example 1, except that 2-methylfuran as an additive was not used, and 1,2-dimethoxyethane and 1,3-dioxolane as organic solvents were mixed in the volume ratio of Table 1 below.

TABLE 1

| | Organic solvent | | | Volume ratio of |
|---|---|---|---|---|
| | 1,2-dimethoxy-ethane | 1,3-dioxolane | Additive 2-methyl-furan | additive relative to 100 volume ratio of organic solvent |
| Preparation Example 1 | 4.5 | — | 1 | 22.2 volume ratio |
| Preparation Example 2 | 5 | — | 1 | 20 volume ratio |
| Preparation Example 3 | 5.5 | — | 1 | 18.2 volume ratio |
| Preparation Example 4 | 6 | — | 1 | 16.7 volume ratio |
| Preparation Example 5 | 0.5 | — | 1 | 200 volume ratio |
| Preparation Example 6 | 2.5 | — | 1 | 40 volume ratio |
| Preparation Example 7 | 4 | — | 1 | 25 volume ratio |
| Preparation Example 8 | 4 | 1 | 1 | 20 volume ratio |
| Preparation Example 9 | 2 | 1 | 1 | 33.3 volume ratio |
| Preparation Example 10 | 2 | 1 | — | — |
| Preparation Example 11 | 1 | 1 | — | — |

* Table 1 means the volume ratio (v/v) to be mixed for the preparation of an electrolyte solution for a lithium-sulfur battery Manufacture of Lithium-Sulfur Battery: Examples 1 to 4 and Comparative Examples 1 to 7

Example 1

Water was used as a solvent, and a sulfur-carbon composite as a positive electrode active material, an electrically conductive material, and a binder were mixed in a ratio of 90:5:5 to prepare a positive electrode active material slurry. At this time, the sulfur-carbon composite was prepared by mixing sulfur and carbon nanotubes (CNT) in a weight ratio of 70:30. In addition, Denka black was used as an electrically conductive material, and styrene-butadiene rubber/carboxymethyl cellulose (SBR:CMC=7:3, weight ratio) was used as a binder.

The slurry of the positive electrode active material was applied to one surface of an aluminum current collector, and then dried to prepare a positive electrode having a porosity of 70% and a loading amount of 4.1 $mAh/cm^2$.

In addition, lithium metal having a thickness of 45 μm was used as the negative electrode.

The prepared positive electrode and the negative electrode were positioned to face each other, and then a polyethylene separator having a thickness of 20 μm and a porosity of 45% was interposed between the positive electrode and the negative electrode. Thereafter, the electrolyte solution for the lithium-sulfur battery of Preparation Example 1 was injected into the inside of the case to manufacture a lithium-sulfur battery.

Examples 2 to 4

Lithium-sulfur batteries were prepared in the same manner as in Example 1, except that the electrolyte solutions of Preparation Examples 2 to 4 were used as the electrolyte solution for the lithium-sulfur battery.

Comparative Example 1 to 7

Lithium-sulfur batteries were prepared in the same manner as in Example 1, except that the electrolyte solutions of Preparation Examples 5 to 11 were used as the electrolyte solutions for the lithium-sulfur battery.

TABLE 2

| | used Electrolyte solution |
|---|---|
| Example 1 | Preparation Example 1 |
| Example 2 | Preparation Example 2 |
| Example 3 | Preparation Example 3 |
| Example 4 | Preparation Example 4 |
| Comparative Example 1 | Preparation Example 5 |
| Comparative Example 2 | Preparation Example 6 |
| Comparative Example 3 | Preparation Example 7 |
| Comparative Example 4 | Preparation Example 8 |
| Comparative Example 5 | Preparation Example 9 |
| Comparative Example 6 | Preparation Example 10 |
| Comparative Example 7 | Preparation Example 11 |

Experimental Example 1: Evaluation of Lifetime Characteristics of Battery

For the lithium-sulfur batteries prepared in Examples 1 to 4 and Comparative Examples 1 to 7, the lifetime characteristics of the batteries were evaluated through repeated charging/discharging cycles, and the results of the evaluation are shown in Table 3 and FIG. 1 below.

Specifically, under the condition of a voltage range of 1.8 to 2.5 V and a temperature for battery operation of 25° C., 3 cycles of 0.1 C initial discharging and then 0.1 C charging/0.1 C discharging were performed, and then 0.2 C charging/0.3 C discharging was repeated to evaluate the lifetime characteristics of the battery.

TABLE 3

| | Number of cycles to reach 80% retention |
|---|---|
| Example 1 | 150 |
| Example 2 | 145 |
| Example 3 | 125 |
| Example 4 | 120 |
| Comparative Example 1 | 70 |
| Comparative Example 2 | 90 |
| Comparative Example 3 | 110 |
| Comparative Example 4 | 50 |
| Comparative Example 5 | 40 |
| Comparative Example 6 | 40 |
| Comparative Example 7 | 35 |

Through the results of Table 3 and FIG. 1, it was confirmed that the lithium-sulfur batteries of Examples 1 to 4, which contain an electrolyte solution that does not contain 1,3-dioxolane, have a high-capacity retention rate even after repeated cycles, as compared to Comparative Examples 4 to 7 in which 1,3-dioxolane is comprised in the electrolyte solution, and thus the lifetime characteristics of the batteries are excellent.

In particular, in the cases of the lithium-sulfur batteries of Examples 1 and 2 which contain the electrolyte solution mixed with the heterocyclic compound as an additive at a volume ratio of 19 to 24 relative to 100 volume ratio of the organic solvent, it was confirmed through the results of reaching 80% retention after 145 cycles that the lifespan characteristics of the batteries were the best.

On the other hand, in the cases of the lithium-sulfur batteries of Comparative Examples 1 to 3 which contain the electrolyte solution containing the heterocyclic compound as an additive in a proportion of 25 volume ratio or more relative to 100 volume ratio of the organic solvent, it was confirmed, through the results of reaching 80% retention before 110 cycles due to the excessive increase in the amount of additive mixed even without 1,3-dioxolane, that the lifetime characteristics of the batteries were deteriorated.

Experimental Example 2: Evaluation of Coulombic Efficiency of Battery

For the lithium-sulfur batteries manufactured by Examples 1 to 4 and Comparative Examples 1 to 7, the coulombic efficiency of the batteries was evaluated, and the results up to the number of cycles to reach 80% retention are shown in FIG. 2.

According to FIG. 2, in the case of Examples 1 to 4 in which 1,3-dioxolane was not used, it was confirmed that the Coulombic efficiency was not significantly decreased even after 120 cycles were repeated.

However, it was expected that Comparative Examples 4 to 7 including 1,3-dioxolane as an organic solvent can maintain the Coulombic efficiency before 50 cycles to reach 80% retention, but after that, as the batteries were deteriorated and the cycles were repeated, the Coulombic efficiency of the batteries are sharply decreased, thereby deteriorating the lifetime efficiency characteristics of the batteries.

Therefore, it was confirmed that when 1,3-dioxolane is not comprised as an organic solvent and an electrolyte solution using a heterocyclic compound is comprised as an additive, excellent Coulombic efficiency and improved battery lifetime characteristics are exhibited.

In particular, in the case where 1,3-dioxolane was not used and the electrolyte solution contains the heterocyclic compound in a volume ratio of 1 to 24 as an additive relative to 100 volume ratio of the organic solvent, it was confirmed that the battery lifetime characteristics were also improved through the improvement of the Coulombic efficiency.

All simple modifications and variations of the present disclosure shall fall within the scope of the present disclosure, and the specific protection scope of the present disclosure will become apparent from the appended claims.

The invention claimed is:

1. An electrolyte solution for a lithium-sulfur battery, comprising:

a lithium salt;

an organic solvent; and an additive, wherein the additive comprises a heterocyclic compound containing one or more double bonds, wherein a hetero atom contained in a ring of the heterocyclic compound is an oxygen atom or a sulfur atom, wherein the organic solvent is selected from the group consisting of a linear ether-based solvent, a cyclic ether-based solvent, and a combination thereof, wherein the organic solvent comprises at least dimethoxyethane, wherein the cyclic ether-based solvent excludes a solvent selected from the group consisting of dioxolane, methyldioxolane, dimethyldioxolane, vinyldioxolane, methoxydioxolane, ethylmethyldioxolane, and a combination thereof, wherein the heterocyclic compound is comprised in a volume ratio of 15 to 24 relative to 100 volume ratio of the organic solvent, and wherein the heterocyclic compound is selected from the group consisting of furan, 2-methylfuran, 3-methylfuran, 2-ethylfuran, 2-propylfuran, 2-butylfuran, 2,3-dimethylfuran, 2,4-dimethylfuran, 2,5-dimethylfuran, pyran, 2-methylpyran, 3-methylpyran, 4-methylpyran, benzofuran, 2-(2-nitrovinyl)furan, thiophene, 2-methylthiophene, 2-ethylthiophene, 2-propylthiophene, 2-butylthiophene, 2,3-dimethylthiophene, 2,4-dimethylthiophene, 2,5-dimethylthiophene, and a combination thereof.

2. The electrolyte solution for the lithium-sulfur battery according to claim 1, wherein the organic solvent consists of a linear ether-based solvent.

3. The electrolyte solution for the lithium-sulfur battery according to claim 1, wherein the linear ether-based solvent further comprises dimethyl ether, diethyl ether, dipropyl ether, dibutyl ether, diisobutyl ether, ethylmethyl ether, ethylpropyl ether, ethyltertbutyl ether, dimethoxymethane, trimethoxymethane, diethoxyethane, dimethoxypropane, diethylene glycol dimethyl ether, diethylene glycol diethyl ether, triethylene glycol dimethyl ether, tetraethylene glycol dimethyl ether, ethylene glycol divinyl ether, diethylene glycol divinyl ether, triethylene glycol divinyl ether, dipropylene glycol dimethylene ether, butylene glycol ether, diethylene glycol ethyl methyl ether, diethylene glycol isopropyl methyl ether, diethylene glycol butyl methyl ether, diethylene glycol tertbutyl ethyl ether, ethylene glycol ethyl methyl ether, or a combination thereof.

4. The electrolyte solution for the lithium-sulfur battery according to claim 1, wherein the cyclic ether-based solvent is selected from the group consisting of dioxane, trioxane, tetrahydrofuran, methyltetrahydrofuran, dimethyltetrahydrofuran, dimethoxytetrahydrofuran, ethoxytetrahydrofuran, tetrahydropyran, and a combination thereof.

5. The electrolyte solution for the lithium-sulfur battery according to claim 1, wherein the heterocyclic compound is 2-methylfuran, and wherein the organic solvent is dimethoxyethane.

6. The electrolyte solution for the lithium-sulfur battery according to claim 1, wherein the lithium salt is selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiC_4BO_8$, $LiAsF_6$, $LiSbF_6$, $LiAlCl_4$, $CH_3SO_3Li$, $CF_3SO_3Li$, $(CF_3SO_2)_2$ NLi, $(C_2F_5SO_2)_2NLi$, $(SO_2F)_2NLi$, $(CF_3SO_2)_3$ CLi, lithium chloroborane, lithium lower aliphatic carboxylate, lithium tetraphenyl borate, lithium imide and a combination thereof.

7. A lithium-sulfur battery comprising, a positive electrode;

a negative electrode;

a separator between the positive electrode and the negative electrode; and the electrolyte solution of claim 1.

* * * * *